US008190056B2

(12) United States Patent
Zogg et al.

(10) Patent No.: US 8,190,056 B2
(45) Date of Patent: May 29, 2012

(54) METHOD OF REPLACING AND/OR REMANUFACTURING AN ORGANIC PHOTO CONDUCTOR DRUM FOR AN IMAGE FORMING APPARATUS

(75) Inventors: Jon Zogg, Chesapeake, VA (US); Will Niederstadt, Stevenson Ranch, CA (US)

(73) Assignee: Mitsubishi Kagaku Imaging Corporation, Chesapeake, VA (US)

( * ) Notice: Subject to any disclaimer, the term of this patent is extended or adjusted under 35 U.S.C. 154(b) by 330 days.

(21) Appl. No.: 12/561,537

(22) Filed: Sep. 17, 2009

(65) Prior Publication Data

US 2010/0067943 A1 Mar. 18, 2010

Related U.S. Application Data

(60) Provisional application No. 61/097,673, filed on Sep. 17, 2008.

(51) Int. Cl.
*G03G 15/00* (2006.01)
*G03G 15/02* (2006.01)
*B23P 6/00* (2006.01)
*B23P 19/04* (2006.01)

(52) U.S. Cl. .................... 399/109; 399/116; 29/402.08; 29/525

(58) Field of Classification Search .................. 399/109, 399/116, 117; 29/402.08, 525
See application file for complete search history.

(56) References Cited

U.S. PATENT DOCUMENTS

| | | | | |
|---|---|---|---|---|
| 6,931,226 | B2 | 8/2005 | Chadani et al. | |
| 7,424,244 | B2 | 9/2008 | Williams et al. | |
| 2002/0159787 | A1 * | 10/2002 | Chadani et al. | 399/109 |
| 2004/0074348 | A1 * | 4/2004 | Battistone | 81/302 |
| 2005/0276628 | A1 * | 12/2005 | Anan et al. | 399/109 |
| 2007/0269232 | A1 | 11/2007 | Davison et al. | |

FOREIGN PATENT DOCUMENTS

| | | | |
|---|---|---|---|
| CN | 1182891 | A | 5/1998 |
| WO | WO 2007/081403 | A1 | 7/2007 |

OTHER PUBLICATIONS

Extended Search Report issued Oct. 14, 2011 in European Patent Application No. 09170284.5-2209.
Office Action issued Nov. 16, 2011 in Chinese Patent Application No. 200910209700.0 (with English translation).

* cited by examiner

*Primary Examiner* — David Gray
*Assistant Examiner* — Joseph S Wong
(74) *Attorney, Agent, or Firm* — Oblon, Spivak, McClelland, Maier & Neustadt, L.L.P.

(57) ABSTRACT

Method of replacing an organic photo conductor (OPC) drum of an image forming apparatus, the image forming apparatus having a support carriage arranged to axially support the OPC drum at a first end and a second end. The method includes removing the OPC drum from the support carriage and procuring a replacement OPC drum having a first axial flange/endpin and a second axial flange/endpin. The first axial flange is inserted into the first end of the support carriage and the second end of the support carriage is elastically deformed. Then, the second axial flange is inserted into the second end of the support carriage, and a force is exerted against the second axial flange until the second end of the support carriage returns to an un-deformed state.

8 Claims, 7 Drawing Sheets

METHOD OF REPLACING AND/OR REMANUFACTURING AN ORGANIC PHOTO CONDUCTOR DRUM FOR AN IMAGE FORMING APPARATUS

This application claims priority to U.S. patent application No. 61/097,673, which was filed on Sep. 17, 2008 and is incorporated herein by reference.

BACKGROUND

Organic photo conductor (OPC) drums for image forming apparatuses often need replacing prior to the imaging cartridge the OPC drums are installed into. Thus, there is motivation to replace an OPC and keep using the existing imaging cartridge. However, imaging cartridges are often formed of molded plastic or metal and are not designed to readily accept a new OPC drum. The HP2600 manufactured by Hewlett-Packard Company of Palo Alto, Calif. is an example of such an imaging cartridge. Therefore, it is difficult to replace an OPC drum without damaging the imaging cartridge.

Davison et al. describe in U.S. Patent Application Publication No. 2007/0269232 A1 that an OPC drum can be removed from an imaging cartridge by cutting the OPC drum into smaller pieces. A new OPC drum can then be installed by providing a bushing within the original non-driven socket in the frame, providing the non-driven end of the replacement cylinder with a cap having a bore therein, inserting the replacement cylinder into an operative position in the frame, and then inserting a headed pin through the bushing and the cap to provide a bearing.

Accordingly, the method according to Davison et al. requires several structural additions and modifications to the OPC drum and the imaging cartridge.

Williams et al. describe another solution as discussed in U.S. Pat. No. 7,424,244. Here, Williams et al. discuss replacing the flange structures of the new OPC drum and using an external hub to connect the new OPC drum to the imaging cartridge. These new structures can be axially screwed together to ensure proper connections.

SUMMARY

These known methods include substantial structural alterations and modifications to the OPC drum or the imaging cartridge and multiple steps. Thus, a new method is necessary which requires fewer steps and alterations to the structure of the OPC drum or the imaging cartridge.

Accordingly, one object of this invention is to provide a method of replacing an organic photo conductor (OPC) drum of an image forming apparatus, the image forming apparatus having a support carriage arranged to axially support the OPC at a first end and a second end. The method includes removing the OPC from the support carriage, and procuring a replacement OPC having a first axial endpin/flange and a second axial endpin/flange. The first axial endpin is inserted into the first end of the support carriage. While elastically deforming the second end of the support carriage, the second axial endpin is inserted into the second end of the support carriage. Then, a force is exerted against the second axial endpin until the second end of the support carriage returns to an undeformed state. In a preferred aspect, the first axial endpin is longer than the second axial endpin. In another preferred aspect, the first axial endpin is a drive end of the OPC and the second axial endpin is a non-drive end of the OPC.

In one aspect, the elastically deforming the second end is performed with a prying tool, such as an angled flat-head screw driver. In another aspect, the elastically deforming the second end is performed with a spreading tool, such as convertible pliers.

The foregoing paragraphs have been provided by way of general introduction, and are not intended to limit the scope of the claims. The presently preferred embodiments, together with further advantages, will be best understood by reference to the following detailed description taken in conjunction with the accompanying drawings. Thus, other aspects and benefits of the invention will be inherent in light of the following.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
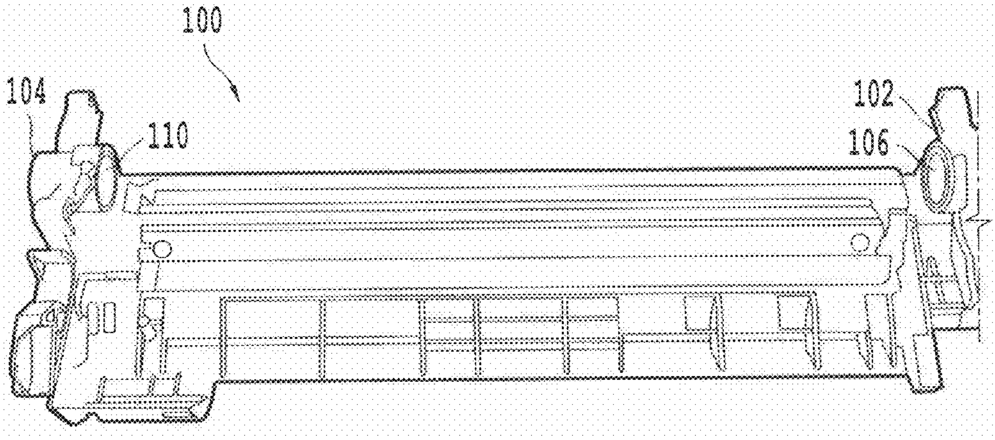
FIG. 1 shows an imaging cartridge for an image forming apparatus.
Figure 2:
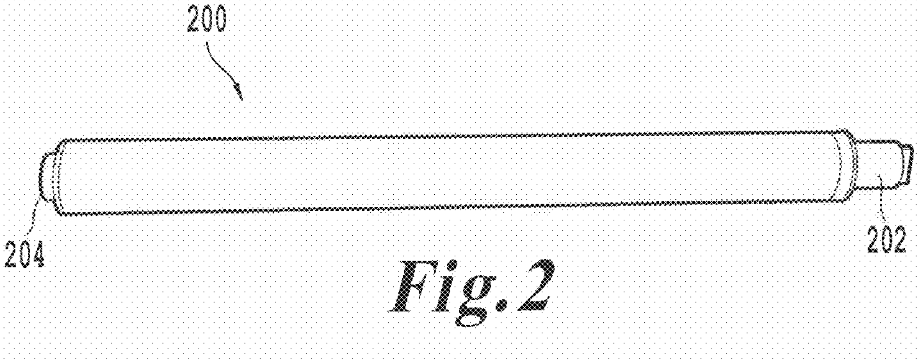
FIG. 2 shows an organic photo conductor (OPC) drum for an image forming apparatus.

Methods of remanufacturing an imaging cartridge including the replacement of an imaging member, such as an organic photo conductor drum (hereinafter referred to as an OPC), in an imaging cartridge that has side or end plates that are fixed to the side of the cartridge are discussed herein. An exemplary imaging cartridge 100 is depicted in FIG. 1 and an exemplary OPC 200 is depicted in FIG. 2. The imaging cartridge 100 depicted in FIG. 1 includes the drum portion of the imaging cartridge. The toner portion generally included with an imaging cartridge is not shown.

The imaging cartridge 100 depicted in FIG. 1 is an HP2600 imaging cartridge in an exemplary aspect, but it should be appreciated any imaging cartridge having a photo conducting drum and two side plates is within the scope of the invention.

Further, it should be appreciated that instead of an OPC 200, any photo conducting drum could be used and the invention discussed herein is not limited to any specific photo conducting drum.

In various aspects discussed herein, methods of replacing an OPC include the replacement of the OPC 200 without the removal of the side plates 102 and 104 of the imaging cartridge.

The OPC 200 is assembled with two supporting flanges or endpins 202 and 204, one at each axial end of the OPC 200. The supporting flange 202 on the drive end of the OPC 200 is longer than the non-drive flange 204. The non-drive flange 204 is comparatively shorter to facilitate assembling the OPC 200 in the imaging cartridge 100.

In a preferred embodiment, the non-drive flange 202 is about 25% the length of a flange on an original OPC (not shown) originally installed into the imaging cartridge 100, which is being replaced. Specifically, in a non-limiting exemplary aspect, the original OPC has a non-drive flange length of about 20 mm whereas the replacement OPC 200 has a non-drive flange length of about 5 mm. In this example, the drive flange 202 of the replacement OPC 200 is about 20 mm long, but may be shorter.

In some aspects, the flanges 202 and 204 are constructed of an injection molded acetal or polyacetal, and the flanges 202 and 204 are attached to the OPC 200 by using an adhesive suitable for such materials.

Figure 3:
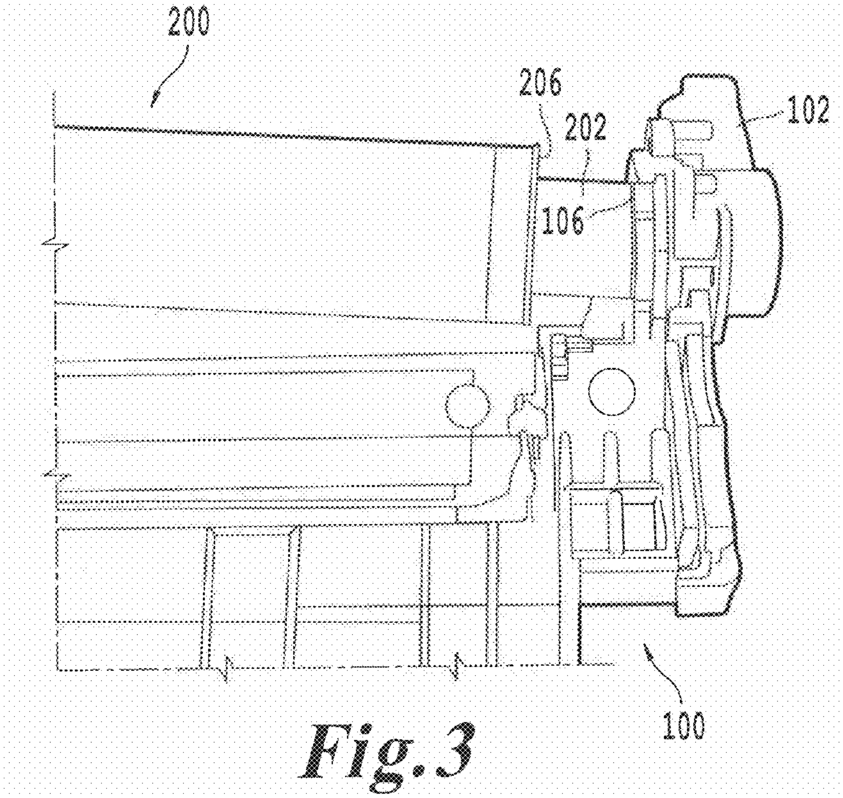
FIG. 3 shows a first end of an OPC being inserted into an imaging cartridge.
Figure 4:
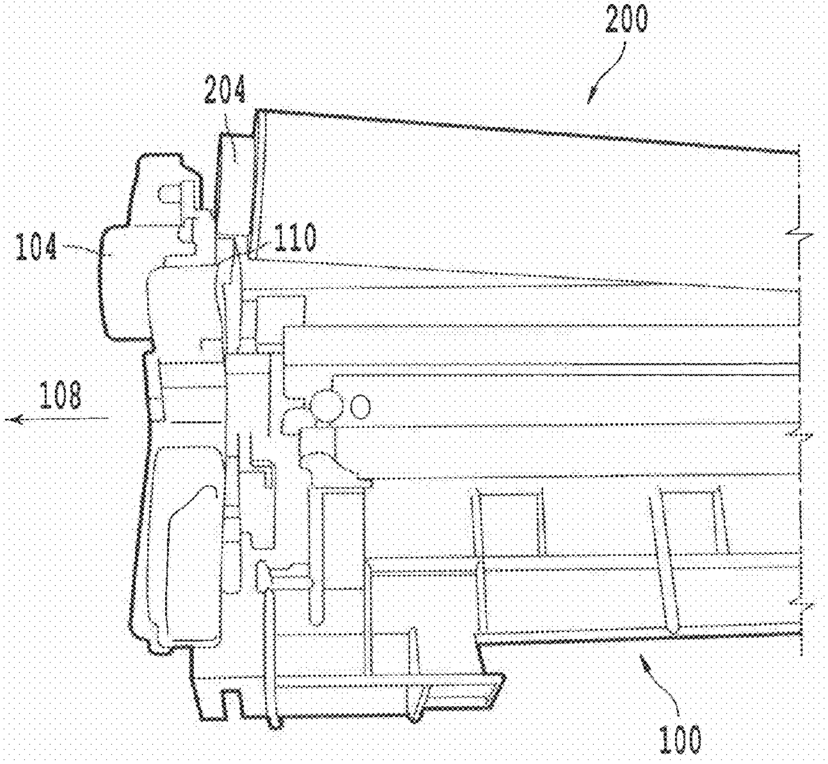
FIG. 4 shows a second end of an OPC being inserted into an imaging cartridge.

In one aspect, the longer flange 202 is inserted into a receptacle 106 of the side plate 102, as shown in FIG. 3. The flange 202 is inserted into the receptacle 106 of the imaging cartridge until the shoulder 206 of the flange 202 contacts a surface of the side plate 102 along the receptacle 106. Preferably, the flange 202 is inserted into the receptacle 106 until the flange 202 cannot be inserted any further. At this point, the shorter flange 204 is preferably resting on the opposing side plate 104, as shown in FIG. 4.

In order to completely install the replacement OPC 200 according to this aspect, the side plate 104 of the portion 100 of the imaging cartridge is elastically deformed or pulled away in the direction opposite the OPC 200 (in the direction of arrow 108) so as to allow the shorter flange 204 to be inserted into receptacle 110 of the side plate 104. In one aspect, a user deforms the side plate 104 accordingly by using the user's hands to pull the plate in the direction of arrow 108 as depicted in FIG. 5.

Figure 5:
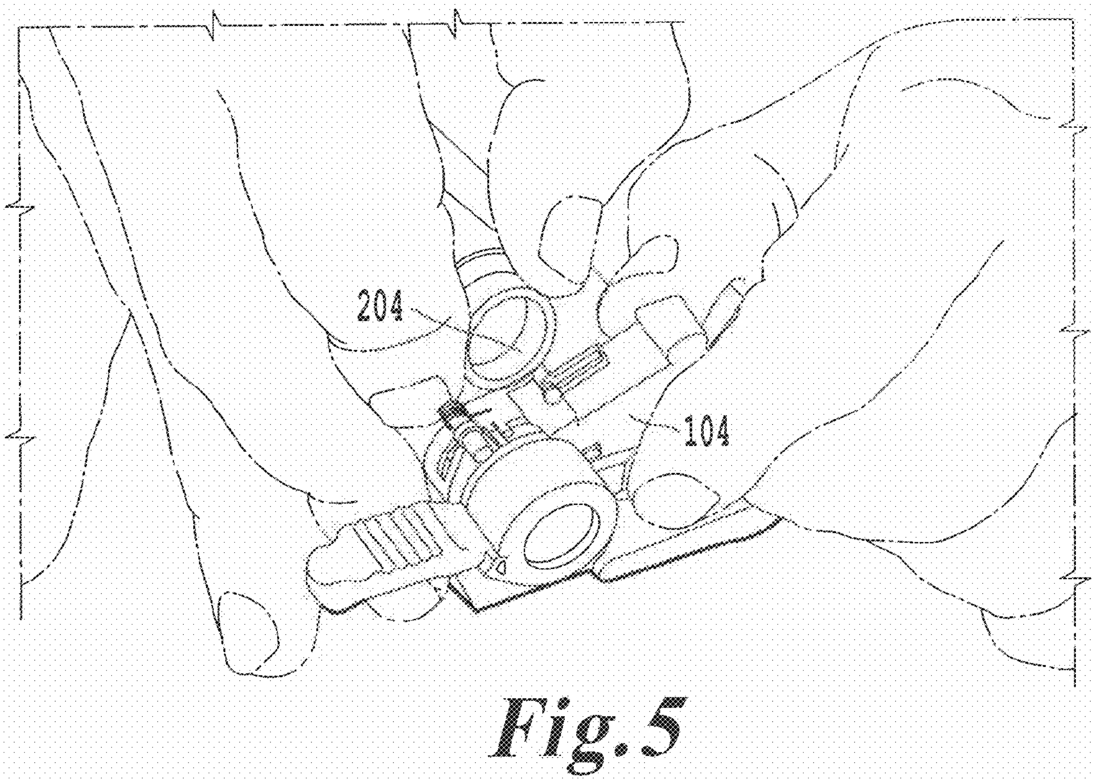
FIG. 5 shows a view of an imaging cartridge being manipulated to accept insertion of an end of an OPC.
Figure 6:
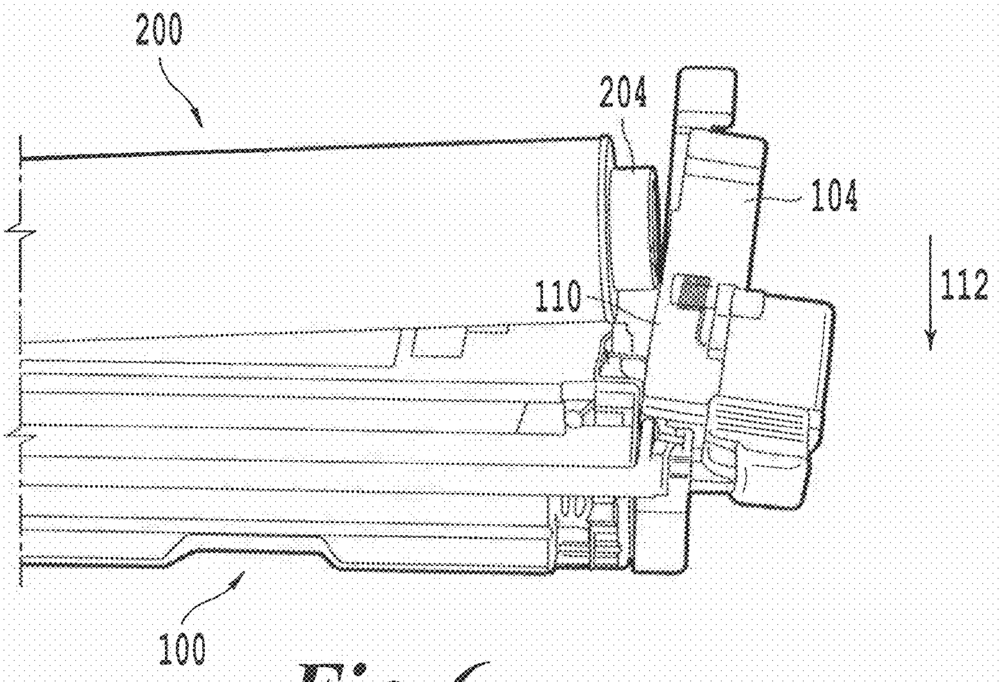
FIG. 6 shows another view of an imaging cartridge being manipulated to accept insertion of an end of an OPC.
Figure 7:
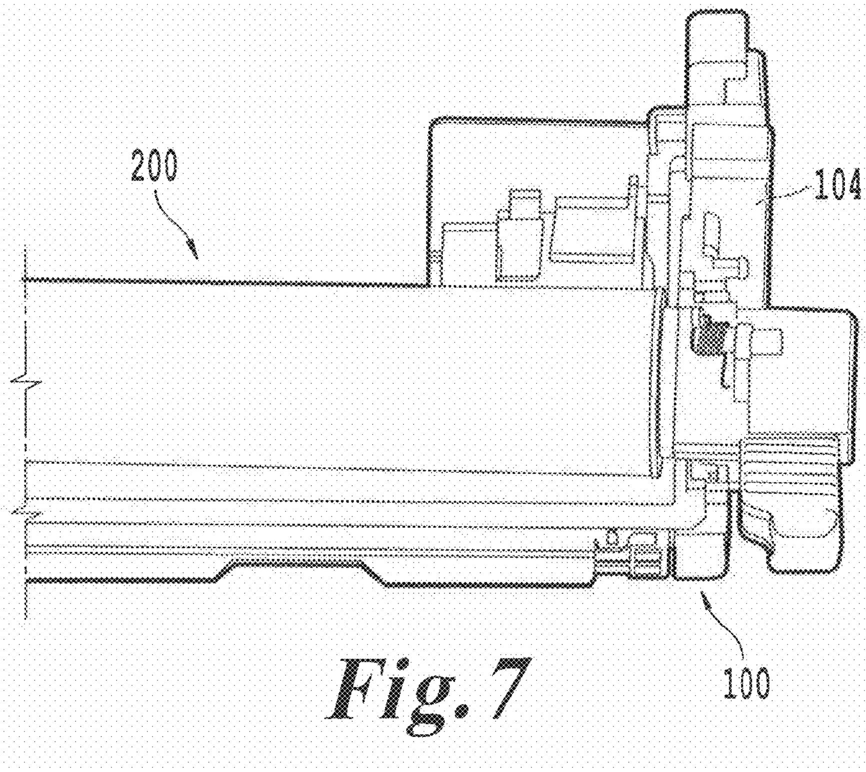
FIG. 7 shows an OPC inserted into an imaging cartridge.

Once the side plate 104 is pulled away from the flange 204, the OPC 200 is pushed downward from the position depicted in FIG. 5 in the direction of arrow 112, with reference to FIG. 6, and the flange 204 is passed by the inside of the side plate 104 and into the receptacle 110 of the side plate 104. FIG. 7 shows the flange 204 inserted into the receptacle 110.

In other words, once the side plate 104 has been pulled away enough to allow the short flange 204 to pass by, a continued downward force in the direction of arrow 112 on the OPC 200 from the position depicted in FIG. 6 will allow the flange 204 of the non-drive hub to insert into the receptacle 110 of the side plate 104, as shown in FIG. 7.

Figure 8:
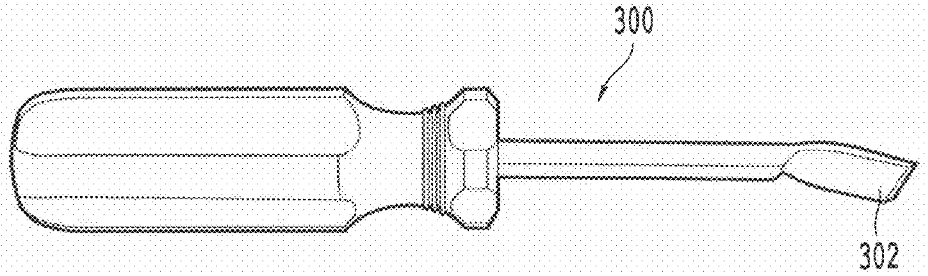
FIG. 8 shows a tool for manipulating an imaging cartridge.

In another aspect of the remanufacturing method, a tool or lever can be used to pull the side plate 104 back so the shorter non-drive flange 204 can be inserted into the receptacle 110 of the side plate 104. Preferable tools include a screw driver, specifically an angled flat head screw driver 300 as depicted in FIG. 8.

Figure 9:
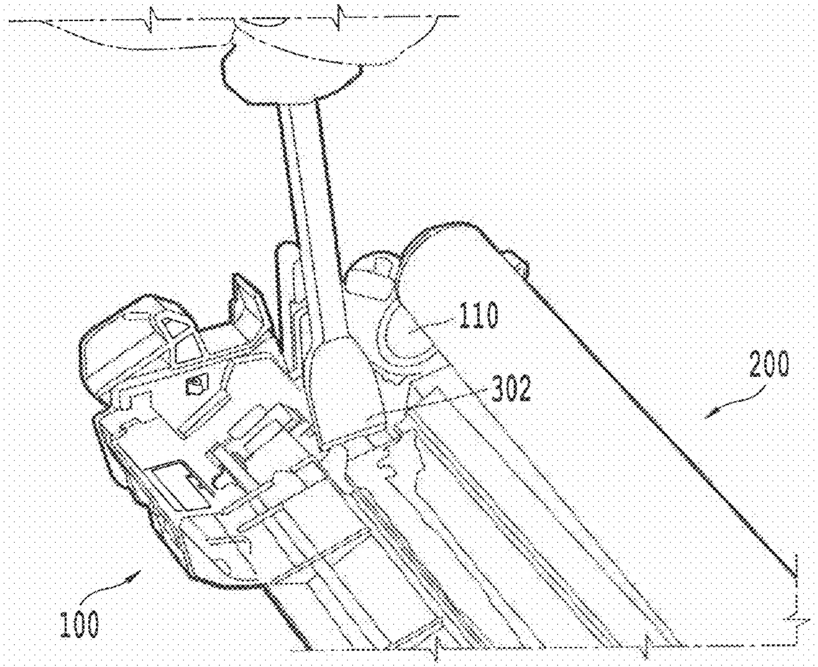
FIG. 9 shows a view of the tool of FIG. 8 manipulating an imaging cartridge.
Figure 10:
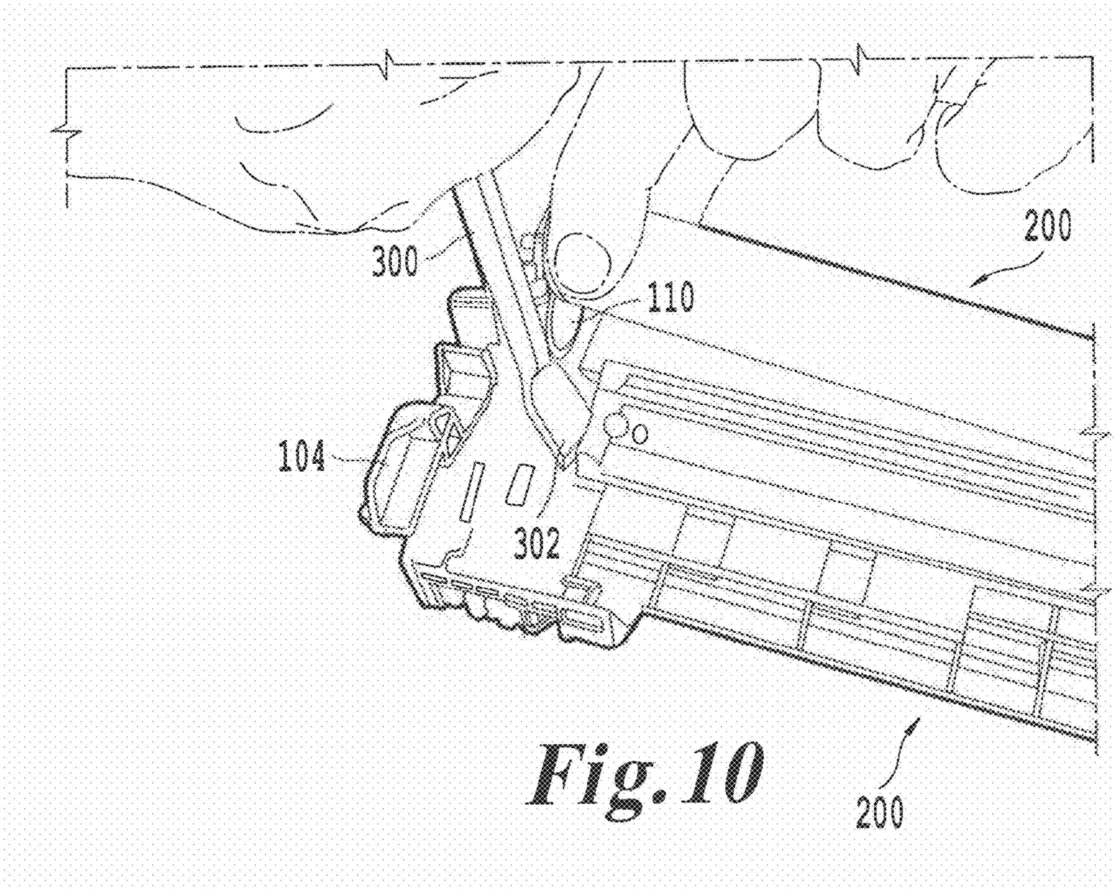
FIG. 10 shows another view of the tool of FIG. 8 manipulating an imaging cartridge.

As shown in FIGS. 9 and 10, a tip 302 of the screw driver 300 is inserted into a joining portion between a base of the imaging cartridge and the side plate 104. Preferably, the screw driver 300 does not make contact with the OPC 200 or the flange 204. Pressure is applied to the screw driver 300 to deform the side plate 104 away from the OPC 200. The OPC 200 is then be pushed downward, as previously discussed, until the non-drive flange 204 inserts into the receptacle 110 of the side plate 104.

Figure 11:
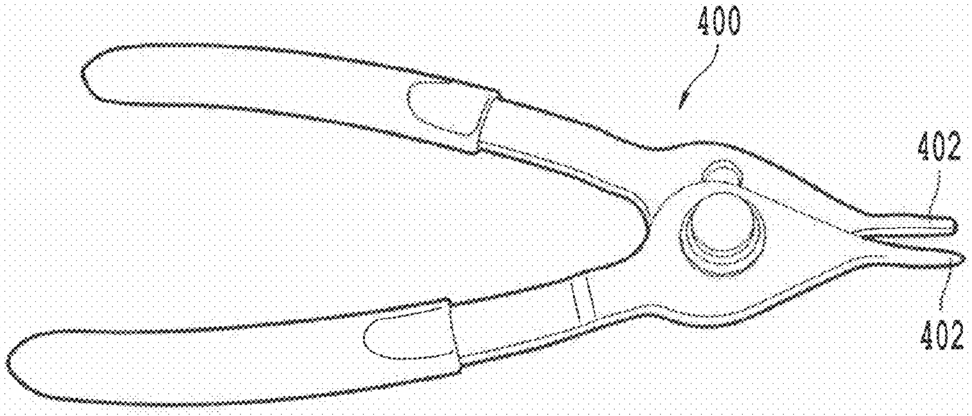
FIG. 11 shows another tool for manipulating an imaging cartridge.

Alternatively, in yet another aspect, a spreading tool such as a pair of convertible pliers 400, as shown in FIG. 11, are used to elastically deform the side plate 104 in a similar manner as discussed above.

Figure 12:
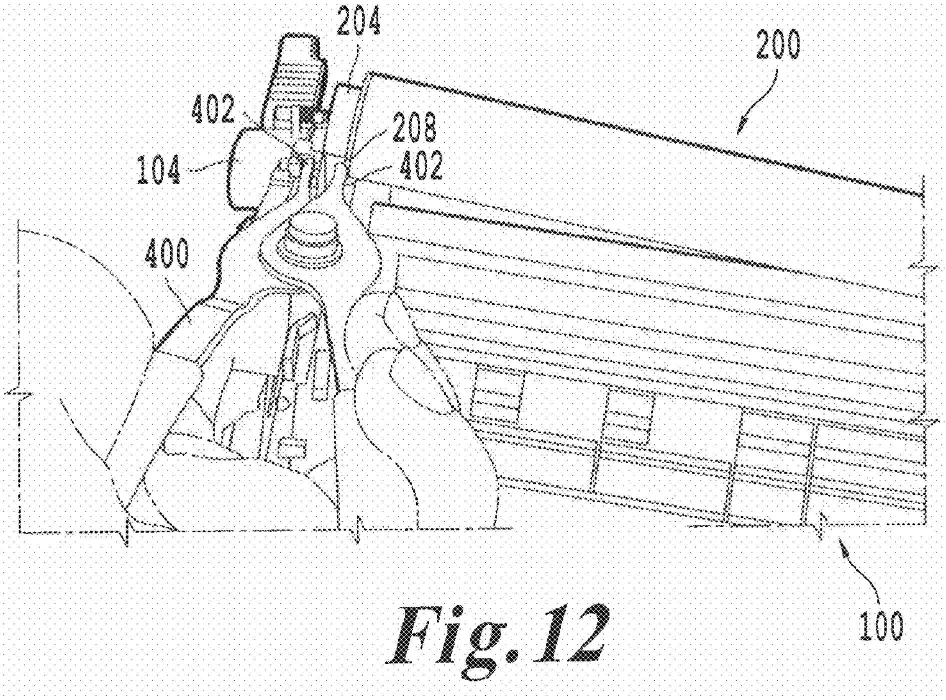
FIG. 12 shows the tool of FIG. 11 manipulating an imaging cartridge.

Specifically, as a compression force is applied to the handles of the convertible pliers 400, the tips 402 of the tool are forced or spread apart. In a preferred aspect, the tips 402 are placed between the side plate 104 and a shoulder 208 of the non-drive flange 204, as shown in FIG. 12. The spreading action of the tips 402 push the side plate 104 away from the flange 204, allowing the flange 204 to pass into the receptacle 110. A downward force is applied to the OPC 200, in a similar manner as discussed above, and the hub on the non-drive flange 204 is inserted into the receptacle 110 in the side plate 104.

Advantageously, the above described methods and aspects are used to remanufacture an imaging cartridge by installing a new OPC drum with flanges without removing the end caps on the imaging cartridge. This can be accomplished by first inserting a longer drive flange of the OPC and then inserting a shorter non-drive flange of the OPC drum, and moving the side plate to create enough clearance to allow the non-drive flange to pass by to the fully inserted position. The movement of the end plate can be accomplished by many methods, but is not limited to using your hands or the tools discussed above to create the elastic deformation of the side plate. Once the hub of the non-drive is in place, the end plate will elastically return to its original position, and the remanufacturing of the imaging cartridge can be completed.

Numerous modifications and variations of the present invention are possible in light of the above teachings. It is therefore to be understood that within the scope of the appended claims, the invention may be practiced otherwise than as specifically described herein.

We claim:

1. A method of replacing an organic photo conductor (OPC) drum of an image forming apparatus, the image forming apparatus having a support carriage arranged to axially support the OPC drum at a first drive end and a second non-drive end, comprising the steps:

removing the OPC drum from the support carriage;

procuring a replacement OPC drum having a first axial drive flange and a second axial non-drive flange which is shorter than a non-drive flange of the removed OPC drum;

inserting the first axial flange into the first end of the support carriage;

elastically deforming the second end of the support carriage;

inserting the second axial flange into the second end of the support carriage; and exerting a force against the second axial flange until the second end of the support carriage returns to an undeformed state.

2. The method according to claim 1, wherein the elastically deforming the second end of the support carriage is performed with a spreading tool.

3. The method according to claim 2, wherein the spreading tool is a convertible pliers

4. The method according to claim 1, wherein the elastically deforming the second end of the support carriage is performed with a prying tool.

5. The method according to claim 4, wherein the prying tool is an angled flat-head screw driver.

6. The method according to claim 1, wherein the second axial flange is shorter than the first axial flange.

7. The method according to claim 1, wherein the second axial flange of the replacement OPC has a length which is about 25% a length of the non-drive flange of the removed OPC.

8. The method according to claim 1, wherein the second axial flange of the replacement OPC has a length of about 5 mm.

* * * * *